United States Patent [19]

Nashiki

[11] Patent Number: 5,066,899
[45] Date of Patent: Nov. 19, 1991

[54] CONTROL METHOD OF INDUCTION MOTOR AND DEVICE THEREFOR

[75] Inventor: Masayuki Nashiki, Ooguchi, Japan

[73] Assignee: Kabushiki Kaisha Okuma Tekkosho, Aichi, Japan

[21] Appl. No.: 497,256

[22] Filed: Mar. 22, 1990

[30] Foreign Application Priority Data

Mar. 24, 1989 [JP] Japan .................................. 1-72089

[51] Int. Cl.⁵ .............................................. H02P 5/40
[52] U.S. Cl. .................................... 318/807; 318/800
[58] Field of Search ............... 187/119; 318/800, 802, 318/803, 805, 807-811

[56] References Cited

U.S. PATENT DOCUMENTS

| | | | |
|---|---|---|---|
| 4,330,741 | 5/1982 | Nagase et al. ........................ | 318/808 |
| 4,503,375 | 3/1985 | Okuyama ........................... | 318/802 |
| 4,671,389 | 6/1987 | Tanahashi ........................... | 318/798 |
| 4,677,361 | 6/1987 | Yonemoto ........................... | 318/805 |
| 4,680,526 | 7/1987 | Okuyama et al. .................... | 318/802 |
| 4,780,658 | 10/1988 | Koyama ............................. | 318/805 |

Primary Examiner—David Smith, Jr.
Attorney, Agent, or Firm—Wenderoth, Lind & Ponack

[57] ABSTRACT

An induction motor is controlled using a control device having a current control loop by detecting a current of the induction motor, and by detecting a current error corresponding to a difference between the detected current of the motor and a current command signal of the control device. The current error is processed to obtain a slip frequency. A field speed control command is generated based on the slip frequency and a motor speed of the induction motor.

20 Claims, 5 Drawing Sheets

PRIOR ART

FIG. 1

PRIOR ART

FIG.6

CONTROL METHOD OF INDUCTION MOTOR AND DEVICE THEREFOR

BACKGROUND OF THE INVENTION

This invention relates to a method and device for controlling an induction motor which can be applied to the spindle driving or servomotor driving of tooling machines and, more particularly, which can control the position, speed and acceleration of the induction motor in a highly responsive and precise manner to thereby obtain a stable operating performance in response to temperature changes and the like.

There have been proposed various control methods for induction motors. Typically, such prior art methods include a voltage/frequency (V/F) control method and a vector control method.

Figure 1:
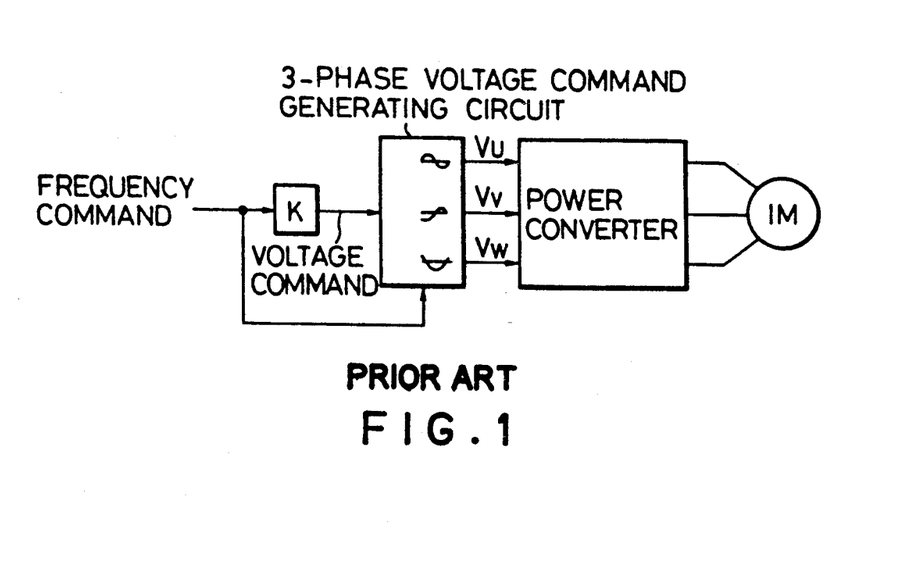
FIG. 1 is a schematic view of a device for realizing a prior art voltage/frequency (V/F) control method.

FIG. 1 is a schematic view of a device for carrying out the prior art voltage/frequency (V/F) control method. This method maintains the excitation current of the induction motor at a constant level by making the ratio of the voltage and the frequency constant.

Figure 2:
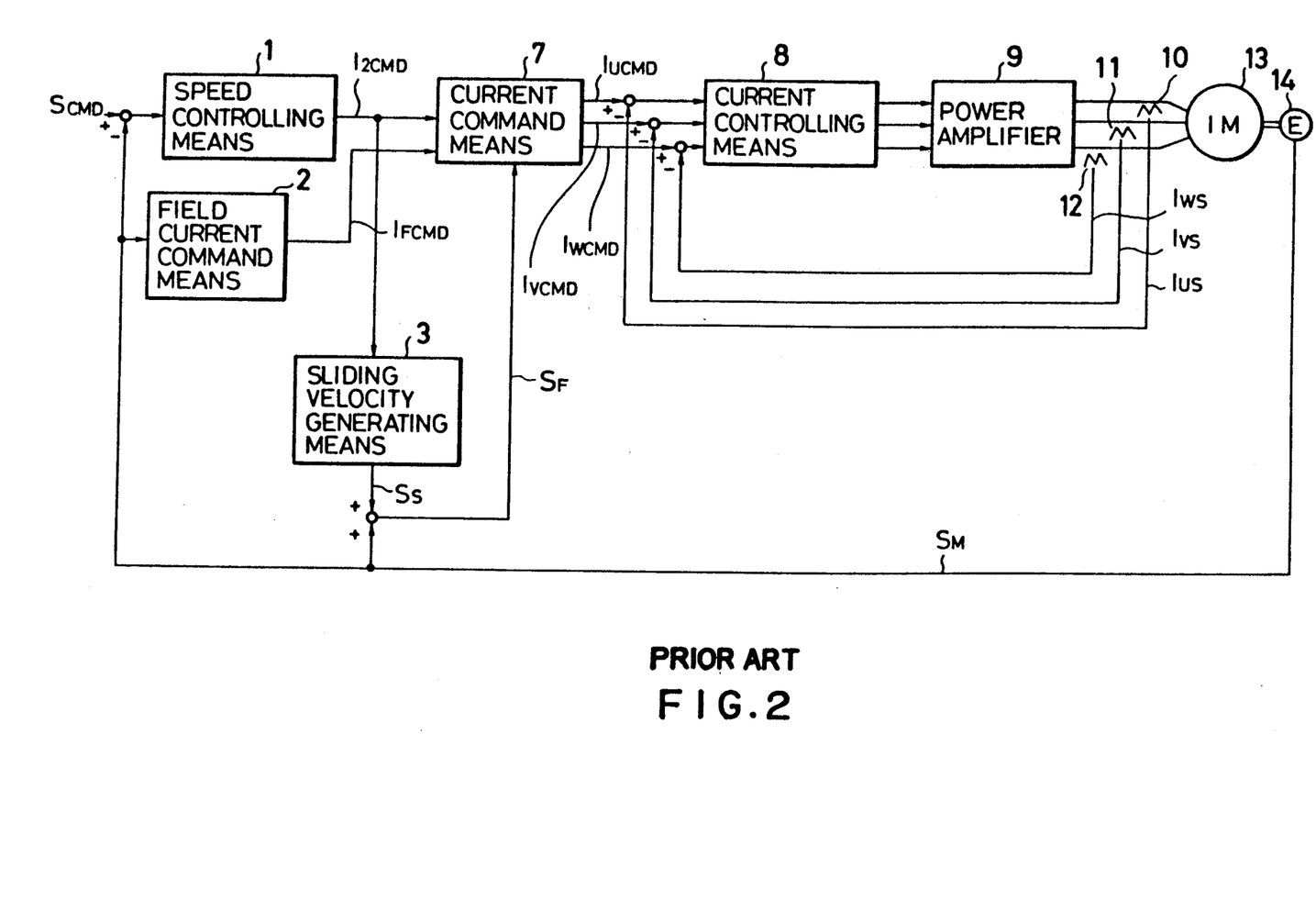
FIG. 2 is a schematic view of a device for realizing a prior art vector control method.
Figure 3:
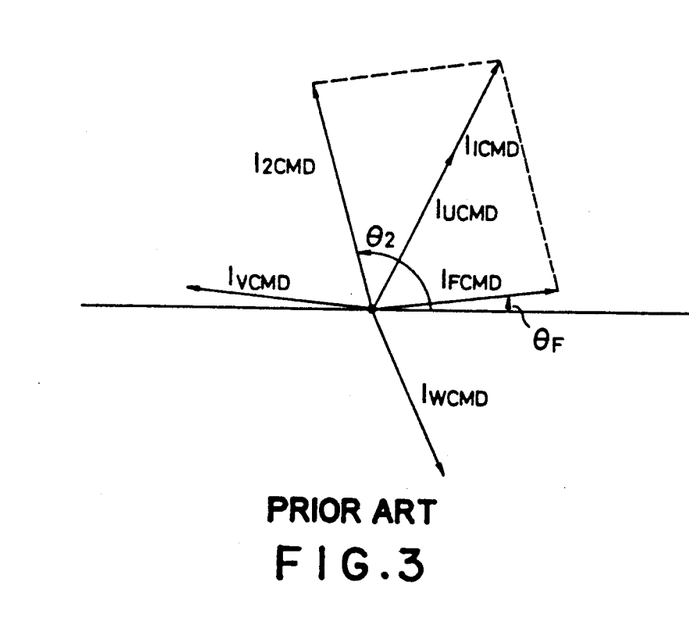
FIG. 3 is an explanatory view for obtaining three-phase current commands.

FIG. 2 is a block diagram of a device for realizing the prior art vector control method. In this method, a speed controlling unit 1 outputs a a difference between a secondary current command $I_{2CMD}$ based on a speed command $S_{CMD}$ and a speed $S_M$ of an induction motor (IM) 13, and a slip frequency generating unit 3 outputs a slip frequency $S_S$ based on the above secondary current command. A field speed $S_F$ is obtained by adding the slip frequency $S_S$ and the speed $S_M$ of the induction motor 13 detected by a speed detector 14. A field current command unit 2 outputs a field current command $I_{FCMD}$ based on the input speed $S_M$ of the induction motor 13. Then a current command unit 7 obtains a rotation angle $\theta_F$ of the field current and the rotation angle $\theta_2$ of the secondary current based on the field speed $S_F$, induces a primary current command $I_{1CMD}$ by composing in format the secondary current command $I_{2CMD}$ and the field current command $I_{FCMD}$ as shown in FIG. 3, converts the thus obtained primary current command into three-phase current commands, i.e. U-phase current command $I_{UCMD}$, V-phase current command $I_{VCMD}$, and W-phase current command $I_{XCMD}$, and then supplies the three-phase current commands to a current controlling unit 8. The current controlling unit 8 controls an applied electric current based on a difference between these current commands and current detected feed back signals to thereby control the induction motor 13 via a power amplifier 9.

The vector control method for the induction motor 13 is summarized as described above. The vector control method also decreases the field to current corresponding to the speed $S_M$ of the induction motor 13 in order to extend the controllable speed range, as well as to control the motor with at a constant power, and changes the secondary current command $I_{2CMD}$ and the slip frequency $S_S$ to be counterproportional to the normal field current command $I_{FCMD}$, but a detailed description of these controls is omitted herein.

The above mentioned prior art voltage/frequency (V/F) control method is problematic in that although it can control the motor with a variable speed, it generally has a slow response time in the case when slip occurs due to an excessive load and the speed changes according to the slip frequency or when the load changes. Theoretically, the prior art vector control method would control an induction motor if it assumes such a motor as an ideal model and controls it precisely. In practice, however, the controllability of an induction motor often raises problems partly because copper is used as the secondary conductor in induction motors, the secondary resistance of which changes by approximately 40% in response to a temperature change of 100° C., and partly because of the imperfection of the control system therefor, whereby the secondary current cannot be controlled properly.

Problematic aspects of the prior art vector control method will be discussed below in further detail.

The operational principle of the induction motor 13 will first be discussed. The torque $T_M$ generated by the induction motor 13 can be expressed by the equation (1) if the field current is denoted as $I_F$, the secondary current as $I_2$, and the torque coefficient as $K_1$.

$$T_M = K_1 \cdot I_F \cdot I_2 \tag{1}$$

The induced voltage $V_2$ is expressed by the equation (2) if the slip frequency is denoted as $S_S$, and the secondary induced voltage coefficient as $K_2$.

$$V_2 = K_2 \cdot I_F \cdot S_S \tag{2}$$

The secondary induced voltage $V_2$ causes a rotor conductor of the induction motor 13 to rotate at the speed of the slip frequency $S_S$. If the secondary time constant $T_2 = L_2/R_2$ ($L_2$: secondary inductance, $R_2$: secondary resistance) is sufficiently smaller than the slip frequency, the secondary current $I_2$ may be expressed as a DC motor as shown in the equation (3).

$$I_2 \approx V_2/R_2 \cdot I_F \cdot S_S/R_2 \tag{3}$$

The speed controllability of the induction motor 13 depends on the torque controllability of the induction motor 13. The response of the induction motor 13 relative to the field current $I_F$ is generally greater than that of the secondary current $I_2$ by at least a factor of ten. Therefore, the controllability of the induction motor 13 is proportional to the controllabilty of the secondary current according to the equation (1). Then, one must consider the controllability of the secondary current. As the response of the field current $I_F$ cannot be satisfactorily large as indicated by the equation (3), it is understood that the torque of the induction motor 13 can be controlled by controlling the slip frequency $S_S$. The sliding frequency command $S_{SCMD}$ is inferentially computed by the slip frequency generating units 3 based on the equation (3) as described in relation to FIG. 2, and expressed as the equation (4) below.

$$S_{SCMD} = \frac{I_{2CMD}}{K_2 \cdot I_{FCMD}} \cdot R_2 \tag{4}$$

The equation (4) indicates that when the secondary resistance $R_2$ varies by approximately 40% due to the temperature change of 100° C., and the temperature on the rotor changes due to a certin driving condition of the induction motor 13, it becomes impossible to issue a precise torque command. This raises the first problem.

When the inferential computation of the slip frequency command $S_{SCMD}$ includes some errors, what compensation is provided by the vector control method? Referring to FIG. 2, if it is assumed that the secondary current becomes insufficient due to an error in the slip frequency command $S_{SCMD}$, the three-phase current control loop, in accordance with the negative feedback of the three-phase primary current, tends to increase the voltage between the terminals of the induction motor 13 and the primary current. However, the correlation between the voltage between the terminals of the induction motor 13 and the secondary current is small from the beginning, and therefore the field current $I_F$ expressed by the equation (1) increases gradually. The increase in the field current causes a secondary reactive current which is not perpendicular to the magnetic field. The secondary active current perpendicular to the magnetic field can be compensated only by a slow increase in the field current $I_F$. The second problem of the method therefore lies in that the three-phase primary current control loop cannot sufficiently control so as to compensate the error caused in the inferential computation of the slip frequency command $S_{SCMD}$ due to the negative feedback of the three-phase primary current.

If it is assumed that the induction motor 13 having an excellent controllability is driven singularly without a load, and the rotor inertia is denoted as $J_M$, the torque can be expressed as equation (5).

$$T_M = J_M \cdot \frac{dS_M}{dt} \qquad (5)$$

If the slip frequency $S_S$ is smaller than an ideal value and the torque $T_M$ of the induction motor 13 is insufficient, the speed $S_M$ of the induction motor 13 gradually decreases to cause errors as indicated by equation (5), and the secondary current command $I_{2CMD}$ is increased by the speed controlling unit 1. The sliding velocity generating unit 3 at the same time increases the slip frequency command $S_{SCMD}$, but these operations are not directly related to above mentioned two problems nor are they capable of solving such problems.

SUMMARY OF THE INVENTION

This invention was contrived to eliminate the aforementioned problems encountered in the prior art, and aims to provide a control method for an induction motor which can precisely control the position, speed, acceleration and current of the induction motor without being seriously affected adjustment errors, control unit errors or temperature changes in the secondary resistance.

According to one aspect of this invention, for achieving the objects described above, there is provided a method for controlling induction motors, using a control device having a current control loop for an induction motor, which includes the steps of obtaining a slip frequency based on current error signals of the induction motor and obtaining field speed commands for the induction motor based on the slip frequency and the speed of the induction motor.

According to another aspect of this invention, there is provided a method for controlling induction motors which includes the steps of inferentially computing a slip frequency based on the secondary current command and the primary resistance, the secondary resistance, the inductance and other constants of the induction motor, adding the slip frequency to the field speed command, and using the sum thereof as a new field speed command.

Further, according to still another aspect if this invention, there is provided a control device for an induction motor having a current control loop which is characterized by a structure includes a current error detecting unit which detects current error signals of the induction motor, a slip compensation unit which obtains a slip frequency compensation value based on the signals sent from the current error detection unit, a slip frequency generating unit which obtains a slip frequency based on the secondary current command, and a field speed command unit which obtains a field speed command for the induction motor based on the slip frequency compensation value, the slip frequency and the speed of the induction motor.

Still further, according to another aspect of this invention, there is provided a control device for an induction motor having a current control loop which is characterized by a structure including a secondary current detection unit which detects secondary current signals of the induction motor, a slip compensation unit which obtains a slip frequency compensation value based on the secondary current command and signals from the secondary current detection unit, a slip frequency generating unit which obtains a slip frequency based on the secondary current command, and a field speed command means which obtains a field speed command for said induction motor based on said sliding velocity compensation value, said sliding velocity and the speed of said induction motor.

The nature, principle and utility of the invention will become more apparent from the following detailed description when read in conjunction with the accompanying drawings.

DESCRIPTION OF THE PREFERRED EMBODIMENT

This invention will now be described in more detail referring to attached drawings.

Figure 4:
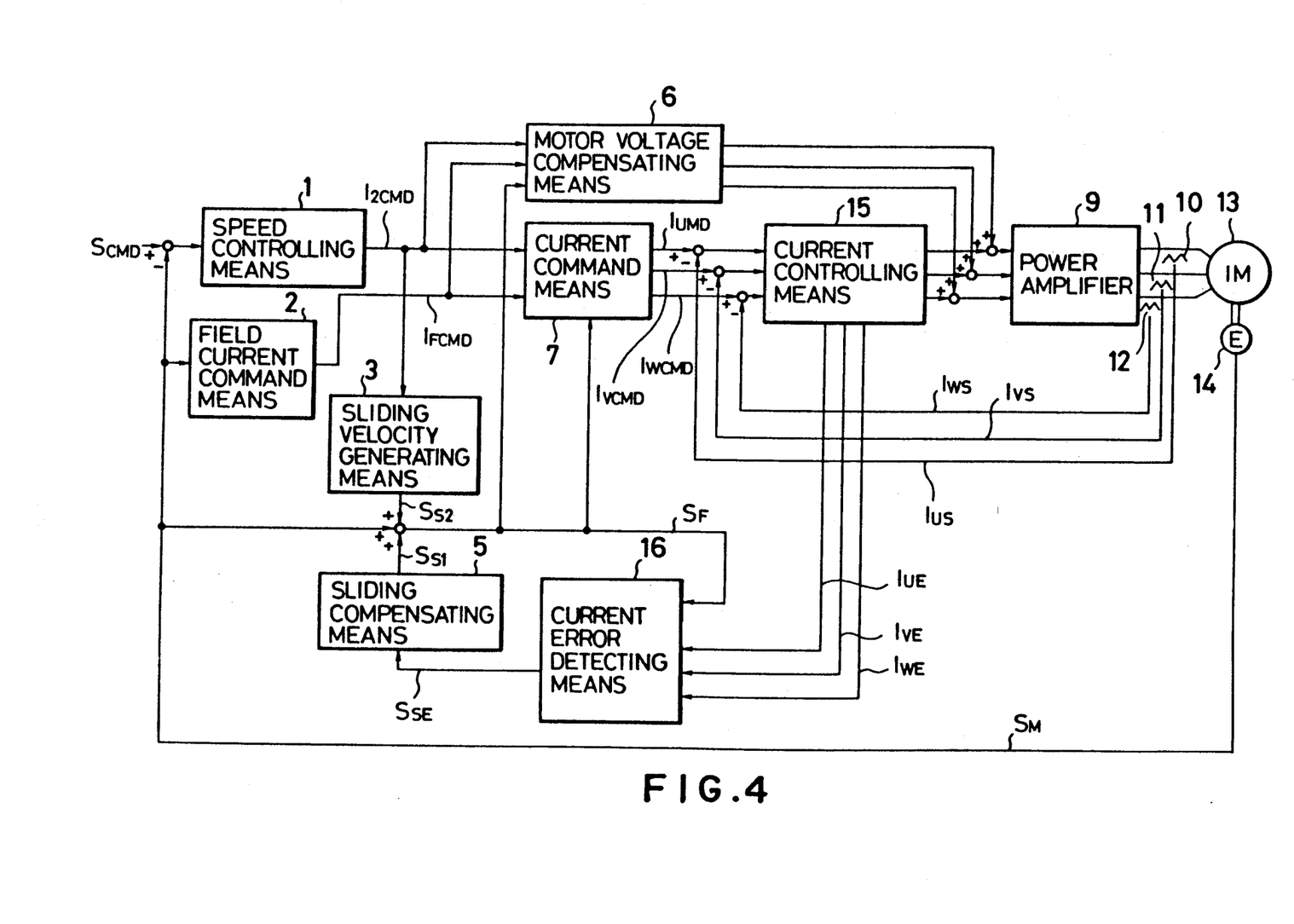
FIG. 4 is a block diagram of an embodiment of a device for realizing the method for controlling an induction motor according to this invention.

Shown in FIG. 4, as compared with the prior art, the device of the invention is additionally provided with: a current error detecting unit 16 which has input thereto three-phase current error signals $I_{UE}$, $I_{VE}$ and $I_{WE}$, which are output from the current controlling unit 15, and which outputs sliding compensation signals $S_{SE}$; a slip compensating unit 5 which processes the sliding correction signals $S_{SE}$ from the current error detecting unit 16 to carry out PID (proportion, integration, differential) compensation or the like and which outputs slip signals $S_{S1}$; and a motor voltage compensating unit 6 which inferentially computes the terminal voltage of the induction motor 13 and improves the precision of the three-phase current control.

The speed controlling unit 1 obtains the secondary current command $I_{2CMD}$ by PID-compensation processing or the like based on the difference between the speed command $S_{CMD}$ and the speed $S_M$ of the induction motor 13 while the field current command unit 2 outputs a field current command $I_{FCMD}$ based on the speed $S_M$ of the induction motor 13.

A three-phase current control loop using the negative feedback of the three-phase primary current will now be described. The results of the subtraction between the three-phase current commands $I_{UCMD}$, $I_{VCMD}$ and $I_{WCMD}$ and three-phase current detection signals $I_{SU}$, $I_{VS}$ and $I_{WS}$ are respectively inputted to the current controlling unit 15, where they are PID compensated, and the outputs from the current controlling unit 15 are inputted to the power amplifier 9 as the three-phase voltage commands of the induction motor 13. The power amplifier 9 processes the signals for PWM-control or the like, amplifies the processed signals using a power transistor, and supplies the outputs thereof as three-phase current to the induction motor 13. The current detection for each of the three phases is conducted respectively by the U-phase current detector 10, the V-phase current detector 11 and the W-phase current detector 12.

The current error detecting unit 16, on the other hand, receives as inputs three-phase current error signals $I_{UE}$, $I_{VE}$ and $I_{WE}$, which are the signals either before or after being processed by the current controlling unit 15 for PID-compensation or the like, obtains the errors in three-phase primary current, and outputs slip correction signals $S_{SE}$. In other words it obtains an electrical degree $\theta_2$ of the rotational phase angle of the secondary current from the field speed $S_F$, and then using the equation (6) below calculates a slip correction signal $S_{SE}$ which is also an amplitude error of the three-phase secondary current.

$$S_{SE} = \frac{2}{3}\left\{ I_{UE} \cdot \sin\theta_2 + I_{VE} \cdot \sin\left(\theta_2 + \frac{2}{3}\pi\right) + I_{WE} \cdot \sin\left(\theta_2 + \frac{4}{3}\pi\right) \right\} \quad (6)$$

The slip compensating unit 5 processes the input slip correction signal $S_{SE}$ for PID-compensation or the like and outputs slip unit signal $S_{S1}$. The slip frequency generating unit 3 inferentially computes the slip frequency of the induction motor 13 based on the secondary current command $I_{2CMD}$ and various constants of the induction motor 13, and outputs a corresponding slip frequency signal $S_{S2}$. The field speed $S_F$ is obtained as the sum of the speed $S_M$, and the slip frequency signals $S_{S1}$ and $S_{S2}$, and by integrating the field speed $S_F$, the rotational displacement angle $\theta_F$ of the field current and the rotational phase angle $\theta_2$ of the secondary current command which is perpendicular thereto are easily obtained. The current command unit 7 receives as inputs the secondary current command $I_{2CMD}$, the field current command $I_{FCMD}$, and the field speed $S_F$, obtains the primary current command $I_{1CMD}$ by composing in vector format the secondary current command $I_{UCMD}$ and the field current command $I_{FCMD}$, and transforms the thus composed vector into three-phase primary current commands $I_{UCMD}$, $I_{VCMD}$ and $I_{WCMD}$ to be output.

The motor voltage compensating unit 6 receives as inputs the secondary current command $I_{2CMD}$ and the field current command $I_{FCMD}$, inferentially computes the terminal voltage thereof using the constants of the induction motor 13, and improves the precision of the three-phase current control by adding respective voltage signals to the voltage command signals of the three-phase current control loop.

Figure 5:
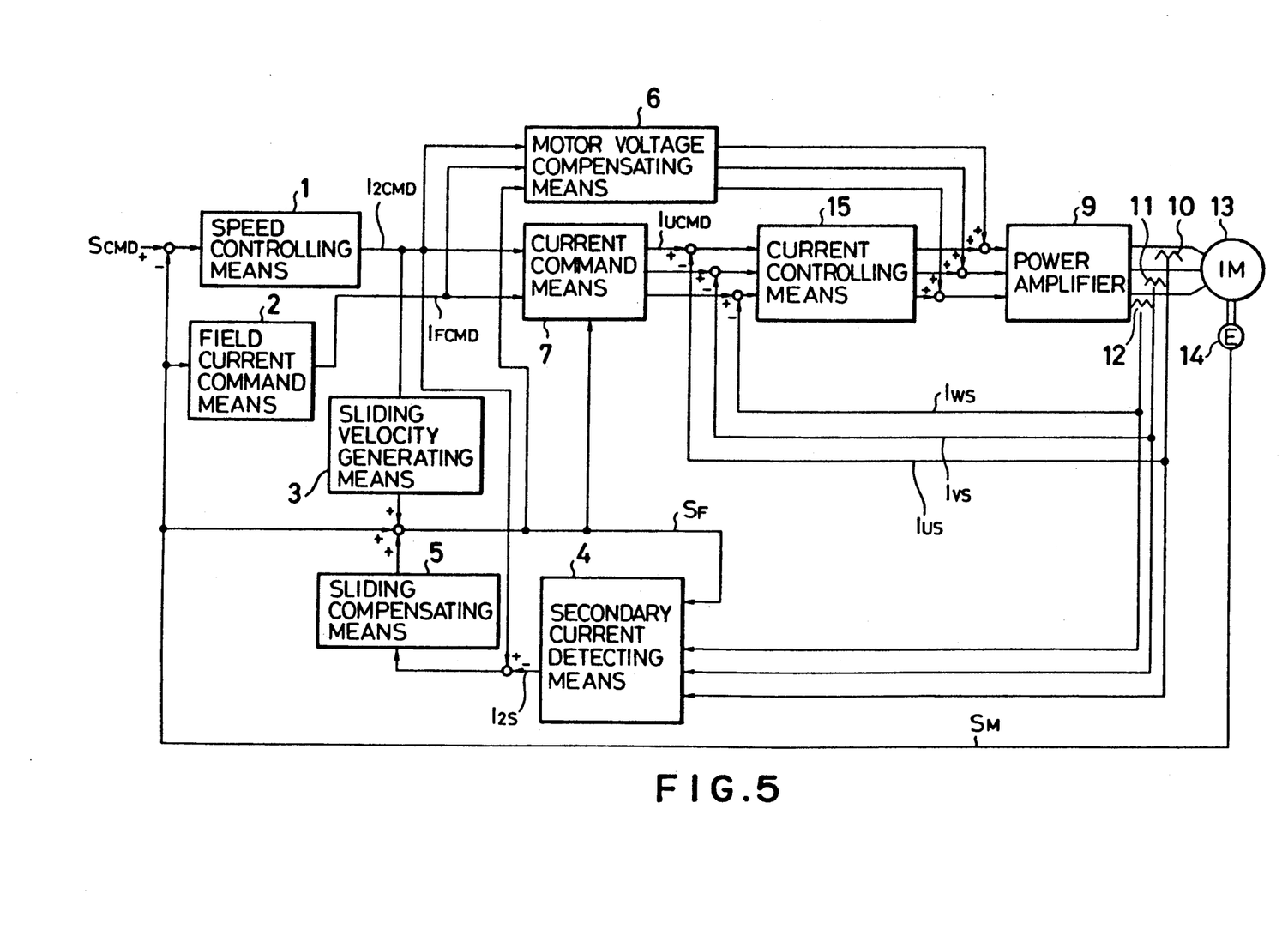
FIG. 5 is a block diagram showing another embodiment of this invention.

Referring now to FIG. 5, another embodiment of this invention will be described.

The secondary current detecting unit 4 receives as inputs the field speed $S_F$ and the three-phase current detection signals $I_{US}$, $I_{VS}$ and $I_{WS}$, and obtains the three-phase AC current amplitude $I_{2S}$ of the secondary current component of the induction motor 13 according to the equation (7) below.

$$I_{2S} = \frac{2}{3}\left\{ I_{US} \cdot \sin\theta_2 + I_{VS} \cdot \sin\left(\theta_2 + \frac{2}{3}\pi\right) + I_{WS} \cdot \sin\left(\theta_2 + \frac{4}{3}\pi\right) \right\} \quad (7)$$

The three-phase AC current amplitude $I_{2S}$ obtained by the secondary current detecting unit 4 is inputted to the sliding compensating unit 5 as the secondary current error signal after the secondary current command $I_{2CMD}$ is subtracted therefrom.

The operation of the preferred embodiments has been described in the foregoing statement. In either of the embodiments shown in FIG. 4 or 5, the following characteristics are observed. The secondary current of the induction motor 13 is controlled using negative feedback control which increases/decreases the slip frequency command $S_{SCMD}$ which would directly affect an increase/decrease of the secondary current based on either the primary current error or the secondary current error. If the amplification factor of the negative feedback loop is set sufficiently high, changes caused by the temperature on the secondary resistor of the induction motor 13 or slight adjustment errors in the controlling unit itself cannot greatly affect the control, and thus a control having an extremely quick response and high precision becomes possible.

Figure 6:
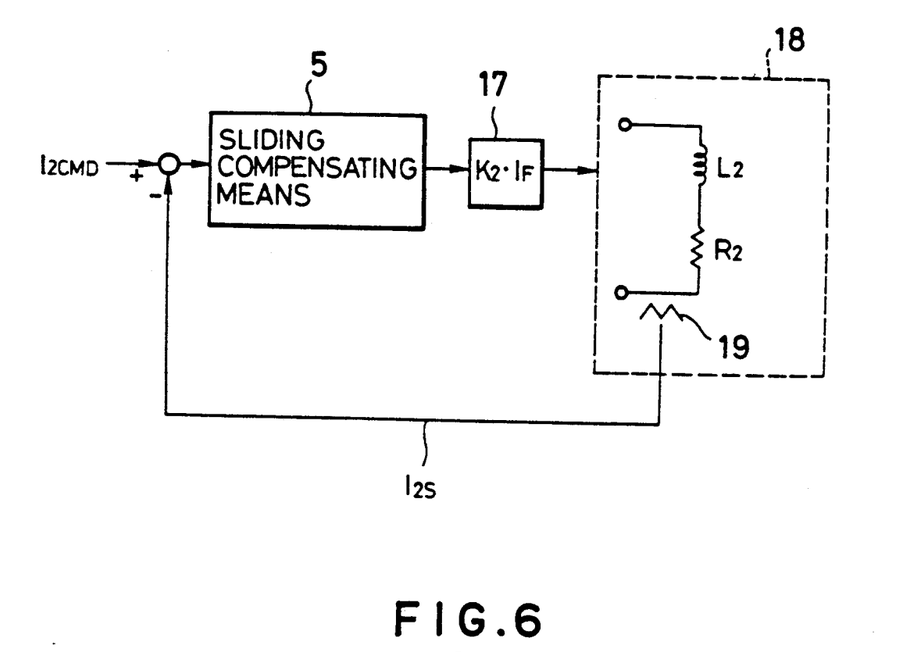
FIG. 6 is an explanatory view of an embodiment of this invention.

In the prior art control method, control errors of the secondary current occur due to changes in temperature on the secondary resistor since the control of the slip frequency, which has a direct effect an increase/decrease of the secondary current, is conducted by inferential computation including the secondary resistor of the induction motor 13. According the method of this invention as realized by the aforementioned two embodiments, slip frequency control is included within the negative feedback loop of the secondary current control in contrast to the prior art. The secondary current control may also be expressed in terms of DC as shown in FIG. 6. In other words, the secondary current control includes a slip compensating unit 5, a transfer function 17 obtained according to the equation (2) and expressed by the equation (8) below, and an equivalent circuit 18 of the rotor impedance including the secondary inductance $L_2$, the secondary resistance $R_2$ and a secondary current detector 19.

$$\frac{V_2}{S_S} = K_2 \cdot I_F \qquad (8)$$

As shown in FIG. 6, this method can write the secondary current control of an induction motor as a current control with an extremely simple RL load to remarkably facilitate understanding of this excellent controllability.

In each of the aforementioned embodiments, the speed of an induction motor 13 is controlled generally by weakening the field in accordance with the speed $S_M$ of the induction motor 13 within the high speed rotational range and by changing the secondary current command $I_{2CMD}$ and the slip frequency command $S_{SCMD}$ to be counterproportional to the field current command $I_{FCMD}$ in order to extend the speed control range as well as to obtain a constant power control. As the above operations are not directly relevant to this invention and similar to the prior art, an explanation thereof is omitted.

Although a three-phase induction motor is described in the foregoing statement, the method of this invention is applicable to a linear induction motor, a two-phase induction motor or induction motors of four phases or more. Moreover, various controls are conducted in the embodiments using hardware, but the control may effected using software and a mirco-processor, or conversion may be partially conducted using a ROM table.

As stated in detail above, according to the control method of this invention for induction motors and the device therefor, the control becomes less prone to variations in parameters or temperature changes of the induction motor because the secondary impedance of the induction motor is directly included within a secondary current control feedback loop. The current can therefore be controlled more precisely to improve response in acceleration control and/or speed control to improve the overall precision control of the induction motor.

It should be understood that many modifications and adaptaions of the invention will become apparant to those skilled in the art and the invention is intended to encompass such obvious modifications and changes in the scope of the claims appended hereto.

What is claimed is:

1. An induction motor control device having a current control loop, said device comprising:
    means for detecting a current of the induction motor and for outputting corresponding current error detection signals, said current error corresponding to a difference between said current detection signals and a current command signal of the control device;
    slip compensation means for processing said current error detecting signals to obtain a slip compensation value and for outputting the slip compensation value;
    slip frequency generating means for generating and outputting a slip frequency signal based on a secondary current command of the control device;
    means for detecting a motor speed of the induction motor and outputting a corresponding motor speed signal; and,
    means for generating a field speed signal for the induction motor, said field speed signal being generated based on a sum of said slip frequency signal, said slip compensation value and said motor speed signal.

2. An induction motor control device having a current control loop, said device comprising:
    means for detecting a secondary current of the induction motor and for outputting corresponding secondary current detection signals;
    slip compensation means for processing said secondary current detection signals and a secondary current command to obtain a slip compensation value and for outputting the slip compensation value;
    slip frequency generating means for generating and outputting a slip frequency signal based on a secondary current command of the control device;
    means for detecting a motor speed of the induction motor and outputting a corresponding motor speed signal; and,
    means for generating a field speed signal for the induction motor, said field speed signal being generated based on a sum of said slip frequency signal, said slip compensation value and said motor speed signal.

3. A method of controllign an induction motor using a control device having a current control loop, said method comprising the steps of:
    detecting N phase currents of the induction motor and outputting corresponding N current detection signals, N being a positive integer;
    detecting N current errors and outputting corresponding N current error detection signals, the N current errors corresponding to a difference between the N current detection signals and a corresponding one of N current command signals of the control device;
    processing the N current error detection signals to obtain a first slip frequency and outputting a corresponding first slip frequency signal;
    detecting a motor speed of the induction motor and outputting a corresponding motor speed signal; and,
    generating a field speed signal for the induction motor, the field speed signal being generated based on at least a sum of the first slip frequency signal and the motor speed signal;
    wherein said processing step includes (1) obtaining a secondary current error signal corresponding to a sum of N products, the N products corresponding to the N current error detection signals multiplied by a respective normalized phase of a secondary current command, and (2) obtaining the first slip frequency signal by subjecting the secondary current error signal to a predetermined processing.

4. A method as recited in claim 3, further comprising:
    obtaining a second slip frequency signal corresponding to the secondary current command;
    wherein the field speed signal is based on a sum of the first and second slip frequency signals and the motor speed signal.

5. A method as recited in claim 3, further comprising:
    obtaining a field current command in accordance with the motor speed signal; and,
    generating the N current command signals in accordance with the field current command, the secondary current command, and the field speed signal.

6. A method as recited in claim 4, further comprising:
    obtaining a field current command in accordance with the motor speed signal; and, generating the N current command signals in accordance with the field current command, the secondary current command, and the field speed signal.

7. A method as recited in claim 3, wherein the predetermined processing of said processing step is PID processing.

8. A method as recited in claim 6, wherein the predetermined processing of said processing step is PID processing.

9. A method as recited in claim 4, wherein the second slip frequency signal is obtained by multiplying the second current command by a coefficient corresponding to at least a secondary resistance of the induction motor.

10. A method as recited in claim 6, wherein the second slip frequency signal is obtained by multiplying the second current command by a coefficient corresponding to at least a secondary resistance of the induction motor.

11. A method as recited in claim 8, wherein the second slip frequency signal is obtained by multiplying the second current command by a coefficient corresponding to at least a secondary resistance of the induction motor.

12. A method as recited in claim 3, wherein N equals three, and wherein the secondary current error signal is obtained in accordance with the following equation:

$$S_{SE} = \frac{2}{3}\left\{ I_{UE} \cdot \sin\Theta_2 + I_{VE} \cdot \sin\left(\Theta_2 + \frac{2}{3}\pi\right) + I_{WE} \cdot \sin\left(\Theta_2 + \frac{4}{3}\pi\right)\right\}$$

where
$S_{SE}$=secondary current error signal,
$I_{UE}$, $I_{VE}$, $I_{WE}$=respective current error detection signals,
$\Theta_2$=phase angle of secondary current command.

13. A method as recited in claim 4, wherein N equals three, and wherein the secondary current error signal is obtained in accordance with the following equation:

$$S_{SE} = \frac{2}{3}\left\{ I_{UE} \cdot \sin\Theta_2 + I_{VE} \cdot \sin\left(\Theta_2 + \frac{2}{3}\pi\right) + I_{WE} \cdot \sin\left(\Theta_2 + \frac{4}{3}\pi\right)\right\}$$

where
$S_{SE}$=secondary current error signal,
$I_{UE}$, $I_{VE}$, $I_{WE}$=respective current error detection signals,
$\Theta_2$=phase angle of secondary current command.

14. A method as recited in claim 6, wherein N equals three, and wherein the secondary current error signal is obtained in accordance with the following equation:

$$S_{SE} = \frac{2}{3}\left\{ I_{UE} \cdot \sin\Theta_2 + I_{VE} \cdot \sin\left(\Theta_2 + \frac{2}{3}\pi\right) + I_{WE} \cdot \sin\left(\Theta_2 + \frac{4}{3}\pi\right)\right\}$$

where
$S_{SE}$=secondary current error signal,
$I_{UE}$, $I_{VE}$, $I_{WE}$=respective current error detection signals,
$\Theta_2$=phase angle of secondary current command.

15. A method as recited in claim 8, wherein N equals three, and wherein the secondary current error signal is obtained in accordance with the following equation:

$$S_{SE} = \frac{2}{3}\left\{ I_{UE} \cdot \sin\Theta_2 + I_{VE} \cdot \sin\left(\Theta_2 + \frac{2}{3}\pi\right) + I_{WE} \cdot \sin\left(\Theta_2 + \frac{4}{3}\pi\right)\right\}$$

where
$S_{SE}$=secondary current error signal,
$I_{UE}$, $I_{VE}$, $I_{WE}$=respective current error detection signals,
$\Theta_2$=phase angle of secondary current command.

16. A method as recited in claim 11, wherein N equals three, and wherein the secondary current error signal is obtained in accordance with the following equation:

$$S_{SE} = \frac{2}{3}\left\{ I_{UE} \cdot \sin\Theta_2 + I_{VE} \cdot \sin\left(\Theta_2 + \frac{2}{3}\pi\right) + I_{WE} \cdot \sin\left(\Theta_2 + \frac{4}{3}\pi\right)\right\}$$

where
$S_{SE}$=secondary current error signal,
$I_{UE}$, $I_{VE}$, $I_{WE}$=respective current error detection signals,
$\Theta_2$=phase angle of secondary current command.

17. A method as recited in claim 5, further comprising:
obtaining N voltage commands in accordance with the secondary current command, the field current command and the field speed signal, and in accordance with a primary resistance, secondary resistance and inductance of the induction motor;
adding the thus obtained N voltage commands to prior N voltage signals to be applied to the induction motor.

18. A method as recited in claim 10, further comprising:
obtaining N voltage commands in accordance with the secondary current command, the field current command and the field speed signal, and in accordance with a primary resistance, secondary resistance and inductance of the induction motor;
adding the thus obtained N voltage commands to prior N voltage signals to be applied to the induction motor.

19. A method as recited in claim 14, further comprising:
obtaining N voltage commands in accordance with the secondary current command, the field current command and the field speed signal, and in accordance with a primary resistance, secondary resistance and inductance of the induction motor;

adding the thus obtained N voltage commands to prior N voltage signals to be applied to the induction motor.

20. A method as recited in claim 16, further comprising:

obtaining N voltage commands in accordance with the secondary current command, the field current command and the field speed signal, and in accordance with a primary resistance, secondary resistance and inductance of the induction motor;

adding the thus obtained N voltage commands to prior N voltage signals to be applied to the induction motor.

* * * * *